(12) United States Patent
Aoyama et al.

(10) Patent No.: US 8,659,766 B2
(45) Date of Patent: Feb. 25, 2014

(54) IMAGE READING APPARATUS, MULTIFUNCTION PRINTER, AND IMAGE READING METHOD

(75) Inventors: Yasuhiro Aoyama, Yokohama (JP); Noriko Takeuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 12/955,529

(22) Filed: Nov. 29, 2010

(65) Prior Publication Data

US 2011/0157616 A1    Jun. 30, 2011

(30) Foreign Application Priority Data

Dec. 24, 2009    (JP) .................... 2009-293200

(51) Int. Cl.
*G06F 3/12* (2006.01)
*H04N 1/40* (2006.01)
*H04N 1/04* (2006.01)
*G11C 7/10* (2006.01)

(52) U.S. Cl.
USPC .......... 358/1.13; 358/443; 358/447; 358/469; 358/474; 365/185.23; 365/189.05

(58) Field of Classification Search
None
See application file for complete search history.

(56) References Cited

U.S. PATENT DOCUMENTS

| 2003/0095618 | A1 | 5/2003 | Iseki ............................ 375/354 |
| 2006/0044629 | A1* | 3/2006 | Kono ............................ 358/483 |
| 2006/0176525 | A1* | 8/2006 | Mizuta et al. ................. 358/474 |
| 2009/0213261 | A1* | 8/2009 | Nagase et al. ................ 348/312 |

FOREIGN PATENT DOCUMENTS

| CN | 1420408 | 5/2003 |
| JP | 2002-209072 | 7/2002 |
| JP | 2007-081540 | 3/2007 |

OTHER PUBLICATIONS

Chinese Action, dated Apr. 3, 2013, in counterpart Chinese Patent Application No. 201010597839.X and English language translation thereof.

* cited by examiner

*Primary Examiner* — Thomas Lett
(74) *Attorney, Agent, or Firm* — Fitzpatrick, Cella, Harper & Scinto

(57) ABSTRACT

This invention is directed to image reading capable of suppressing EMI unwanted radiation while maintaining image quality. To accomplish this, the following processing is executed when reading an original image by a photoelectric transducer. More specifically, a first driving signal where SSCG spread modulation is applied, and a second driving signal where no SSCG spread modulation is applied are generated from a reference signal. Either the first or second driving signal is selected, and a timing signal for reading the original image is generated based on the selected driving signal. The image signal obtained by the photoelectric transducer is latched using the timing signal. The latched image signal is transferred for subsequent image processing. Upon reading a one-line image original, the second driving signal is selected till the completion of the latch operation, and after the latch operation, the first driving signal is selected for an image signal transfer operation.

14 Claims, 12 Drawing Sheets

GENERATION OF BOUNCE BY DRIVING SIGNAL

FIG. 9B

SPREAD MODULATION AND INFLUENCE OF BOUNCE ON IMAGE DATA

IMAGE READING APPARATUS, MULTIFUNCTION PRINTER, AND IMAGE READING METHOD

BACKGROUND OF THE INVENTION

1. Field of the Invention

The present invention relates to an image reading apparatus, multifunction printer, and image reading method. Particularly, the present invention relates to an image reading apparatus, multifunction printer, and image reading method for optically reading an image original.

2. Description of the Related Art

In an image reading apparatus (scanner) having a CMOS solid-state image sensing element for a copying machine, scanner, camera, printer, or the like, and an image forming apparatus using the image reading apparatus, the CMOS solid-state image sensing element photoelectrically converts an original or target image, and generating image data. The analog image data is A/D-converted and undergoes digital processing, obtaining a digital image. A series of image reading processes is generally performed in synchronism with a scanner driving signal.

Recently, as the speed of image reading processing increases, the scanner apparatus faces the problem of increasing unwanted radiation (EMI: ElectroMagnetic Interference) of electromagnetic waves generated by the scanner apparatus. A regulatory/certification organization in each country defines the EMI radiation level, and the radiation needs to be suppressed to a regulated value or less. There are various methods to suppress unwanted radiation. As a means for suppressing harmonic radiation of a scanner-driving signal, a technique using SSCG (Spectrum Spreading Clock Generator) has been proposed.

SSCG is a technique of spreading the frequency of a driving signal in a predetermined modulation cycle. In an image reading apparatus using the SSCG technique, image noise sometimes occurs along with spread modulation during a series of reading processes. It is often difficult to suppress unwanted radiation while maintaining the image quality. Under such circumstances, various kinds of scheme have been made when applying the SSCG modulation technique to the scanner. For example, Japanese Patent Laid-Open No. 2007-081540 discloses an arrangement which switches on/off spread modulation in a predetermined period of a main scanning line signal when a CCD is used as a solid-state image sensing element. Spread modulation is switched on/off by arranging a control circuit, which controls a driving timing generation circuit to output an enable signal in order to control an SSCG module.

In a given apparatus, EMI radiation may be high in a circuit block including a CCD up to an A/D converter. When spreading a clock signal, high spreading degree contributes to decreasing the EMI radiation level but causes generating image noise. Japanese Patent Laid-Open No. 2002-209072 proposes a method using this characteristic to spread a clock signal at a spreading degree which differs between circuit blocks in accordance with the degree of influence on image noise.

However, if the driving signal of a CMOS solid-state image sensing element undergoes SSCG spread modulation, an electrical noise component may be captured in connection with spread modulation, degrading image quality. To suppress degradation of the image quality, for example, no SSCG spread modulation is adopted or the spread modulation degree is lowered. However, such a measure increases unwanted radiation. As summarized, it is very difficult for the conventional technique to suppress EMI while maintaining the image quality.

Further, it should be noted that recent scanner apparatuses are becoming less robust against external disturbance and electrical noise as the image reading speed increases, and the CMOS solid-state image sensing element and other modules are downsized. Especially in the use of the CMOS solid-state image sensing element, when transferring charges obtained by photoelectric conversion in each pixel at once to the holding capacitor, electrical noise such as external disturbance or bounce noise sometimes enters light reception data, and an unwanted periodical line, density unevenness, stripe, or the like appears in an image.

SUMMARY OF THE INVENTION

Accordingly, the present invention is conceived as a response to the above-described disadvantages of the conventional art.

For example, an image reading apparatus, multifunction printer, and image reading method according to this invention are capable of suppressing EMI unwanted radiation while maintaining the image quality.

According to one aspect of the present invention, there is provided an image reading apparatus which reads an original image by using a photoelectric transducer, comprising: a first generation unit configured to generate, from a reference signal, a first driving signal to which SSCG spread modulation is applied; a second generation unit configured to generate, from the reference signal, a second driving signal to which no SSCG spread modulation is applied; a selection unit configured to select one of the first driving signal and the second driving signal; a timing signal generation unit configured to generate a timing signal for reading the original image, based on the driving signal selected by the selection unit; a latch unit configured to latch an image signal obtained by the photoelectric transducer, using the timing signal generated by the timing signal generation unit; and a transfer unit configured to transfer the image signal latched by the latch unit for subsequent image processing, wherein in a one-line original image reading operation, the selection unit selects the second driving signal till completion of a latch operation by the latch unit, and after the latch operation, selects the first driving signal for an image signal transfer operation by the transfer unit.

According to another aspect of the present invention, there is provided an image reading method in an image reading apparatus which reads an original image by using a photoelectric transducer, comprising: a first generation step of generating, from a reference signal, a first driving signal to which SSCG spread modulation is applied; a second generation step of generating, from the reference signal, a second driving signal to which no SSCG spread modulation is applied; a selection step of selecting one of the first driving signal and the second driving signal; a timing signal generation step of generating a timing signal for reading the original image, based on the driving signal selected in the selection step; a latch step of latching an image signal obtained by the photoelectric transducer, using the timing signal generated in the generation step; and a transfer step of transferring the image signal latched in the latch step for subsequent image processing, wherein in the selection step, in reading of a one-line original image, the second driving signal is selected till completion of a latch operation in the latch step, and after the latch operation, the first driving signal is selected for an image signal transfer operation in the transfer step.

According to still another aspect of the present invention, there is provided a multifunction printer comprising: an image reading apparatus as defined above; and a printing unit configured to print an image on a printing medium based on one of image data indicating an image read by the image reading apparatus, or externally input image data.

The invention is particularly advantageous since EMI unwanted radiation is suppressed while maintaining the image quality.

Further features of the present invention will become apparent from the following description of exemplary embodiments (with reference to the attached drawings).

DESCRIPTION OF THE EMBODIMENTS

An exemplary embodiment of the present invention will now be described in detail in accordance with the accompanying drawings. First of all, the arrangement of a multifunction printer apparatus (to be referred to as an MFP apparatus) adopted as a common embodiment will be explained.

<MFP Apparatus>

Figure 1A:
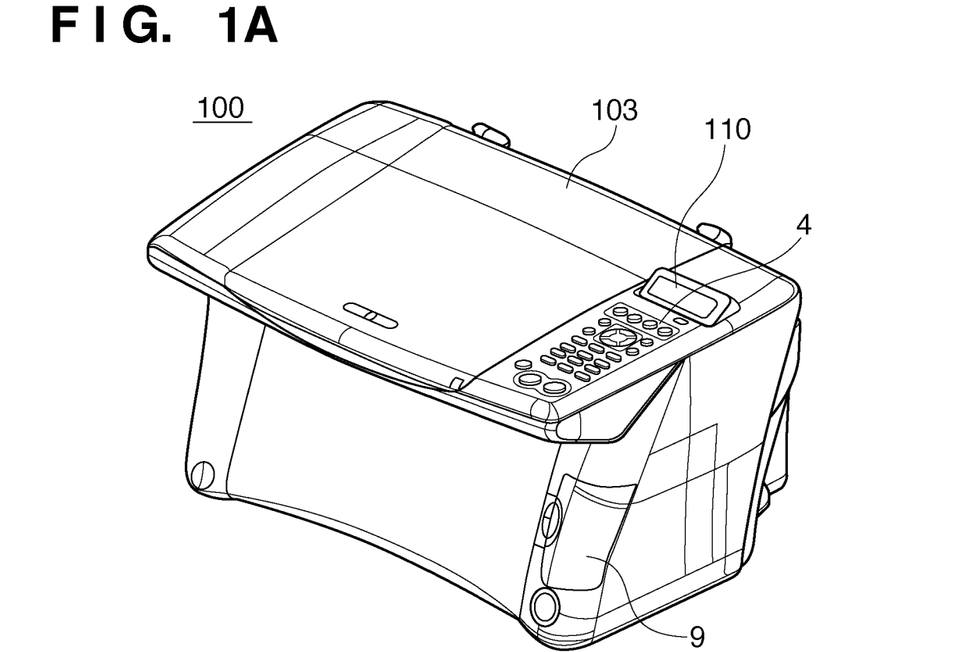
FIGS. 1A and 1B are perspective views of the outer appearance of a multifunction printer (MFP) apparatus as an exemplary embodiment of the present invention.
Figure 1B:
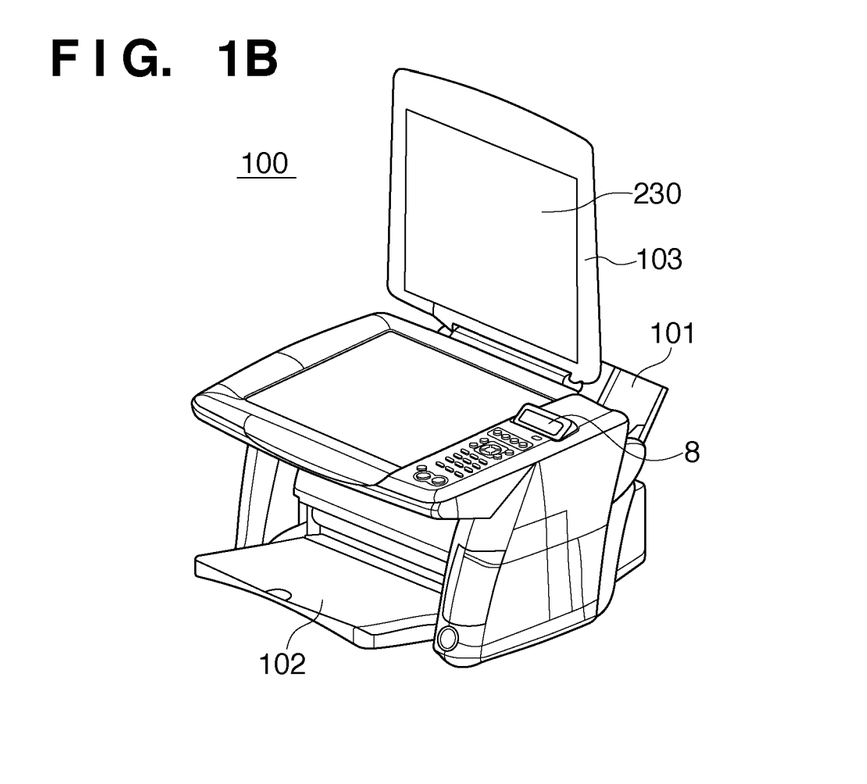

FIGS. 1A and 1B are perspective views of the outer appearance of an MFP apparatus 100 as an exemplary embodiment of the present invention.

The MFP apparatus can print an image on a printing medium such as printing paper, based on image data from a connected host (not shown). In addition, the MFP apparatus can print based on image data stored in a memory card or the like, and can read and copy an image original.

FIG. 1A shows a state in which an original cover 103 is closed. FIG. 1B shows a state in which a printing medium stack tray 101, a discharge tray 102, and the original cover 103 are open. A reading unit 8 having a contact image sensor (CIS) unit reads an image original, and outputs analog brightness signals of R, G, and B components. A card interface 9 is used to insert a memory card or the like which records an image file obtained by shooting with a digital still camera (not shown), and read image data from the memory card in accordance with a predetermined operation on an operation unit 4. The MFP apparatus 100 has a display unit such as an LCD 110. The LCD 110 is used to display the contents of settings made via the operation unit 4 or display a function selection menu.

Figure 2A:
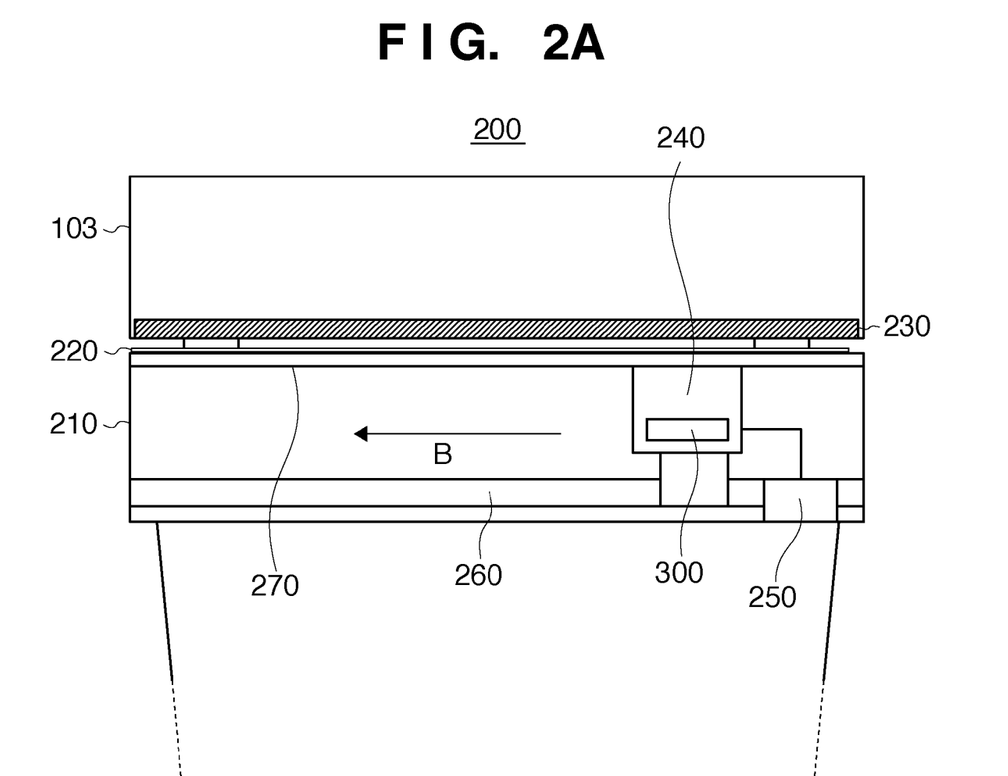
FIG. 2A is a sectional view of an image reading apparatus installed at an upper portion in the MFP apparatus shown in FIGS. 1A and 1B.
Figure 2B:
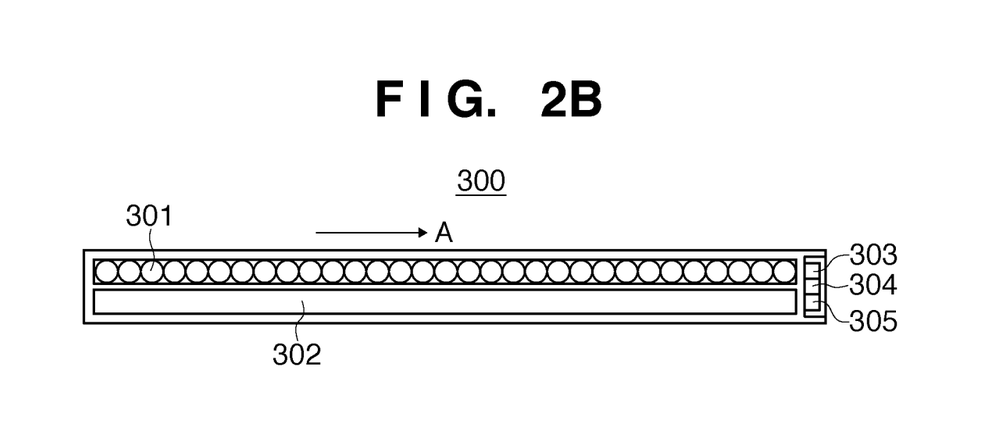
FIG. 2B is a side sectional view showing the detailed structure of a contact image sensor (CIS) unit.

FIG. 2A is a sectional view of an image reading apparatus installed at an upper portion in the MFP apparatus shown in FIGS. 1A and 1B. FIG. 2B is a side sectional view showing the detailed structure of a contact image sensor (CIS) unit 300.

As shown in FIG. 2A, an image reading apparatus 200 includes a main body 210, and a pressure plate 230 which presses an original 220 to be read and cuts off external light. The pressure plate 230 is set on the bottom surface of the original cover 103. The main body 210 includes a reading unit (optical unit) 240, a circuit board 250 electrically connected to the reading unit (optical unit) 240, a sliding rod 260 serving as a rail when scanning the reading unit 240, and a platen glass 270. The reading unit 240 incorporates the CIS unit 300, which irradiates the original 220 with light, receives the reflected light, and converts it into an electrical signal. When reading an image, the reading unit 240 scans the original 220 on the platen glass 270 in a direction (sub-scanning direction) indicated by an arrow B, reading an image printed on the original 220.

As shown in FIG. 2B, the CIS unit 300 includes a red LED 303 which emits red light, a green LED 304 which emits green light, and a blue LED 305 which emits blue light. When reading an original, the respective color LEDs are time-divisionally turned on for each line to uniformly irradiate an original with the emitted light through a light guide 302, and SELFOC® lenses 301 converge the reflected light for respective pixels. The light is formed into an image on photoelectric conversion elements (not shown) in the CIS unit, converting the received light into an electrical signal. Accordingly, a one-line image signal formed from color signals of R, G, and B color components is output. The CIS unit 300 is moved in the sub-scanning direction, reading an image on the entire original surface. Note that a direction indicated by an arrow A, which is the array direction of the cells of the SELFOC® lenses 301, will be called a main scanning direction. The main scanning direction and sub-scanning direction are perpendicular to each other. In FIG. 2A, the main scanning direction is perpendicular to the sheet surface. The CIS unit 300 uses a CMOS sensor as a solid-state image-sensing element.

Figure 3:
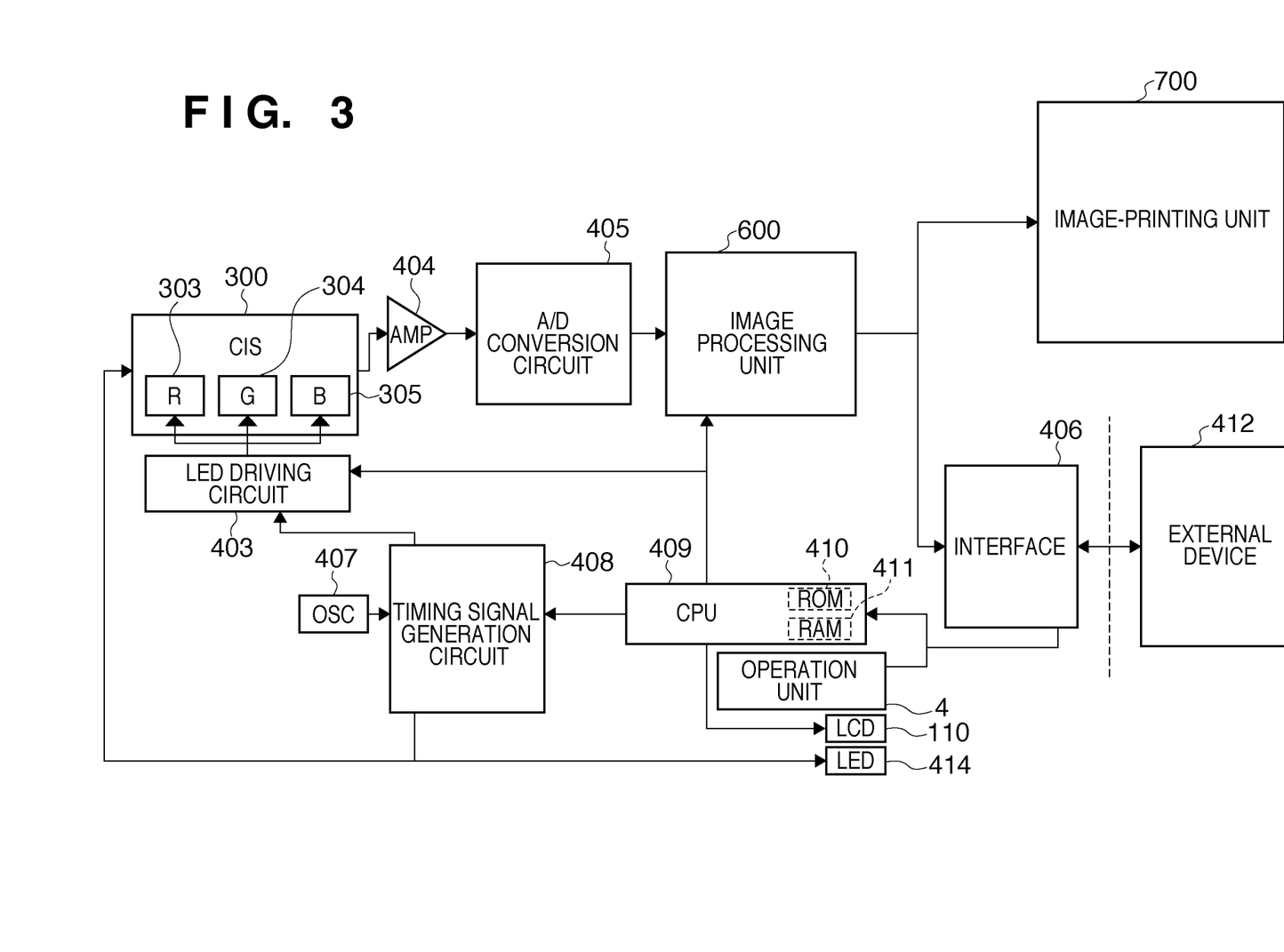
FIG. 3 is a block diagram showing the arrangement of the control circuit of the image reading apparatus.

FIG. 3 is a block diagram showing the arrangement of the control circuit of the image reading apparatus. In FIG. 3, the same reference numerals as those in FIGS. 1A to 2B denote the same parts, and a description thereof will not be repeated.

In the CIS unit 300, an LED driving circuit 403 switches the respective color LEDs 303 to 305 for each line to turn them on. The CMOS sensor (solid-state image sensing element) receives the light, line-sequentially reading a color image. The LEDs 303 to 305 are light sources capable of changing the quantity of light which irradiates an original. The LED driving circuit 403 can arbitrarily turn on the LEDs 303 to 305.

More specifically, the LED driving circuit 403 can turn on the LEDs 303 to 305 one by one sequentially or two of them sequentially, or in some cases, all of them at once. An amplifier (AMP) 404 amplifies a signal output from the CIS unit 300. An A/D conversion circuit 405 A/D-converts the amplified electrical signal, outputting 16-bit digital image data for each pixel and each color component. When the amplifier (AMP) 404 is built in a CMOS semiconductor substrate, like the embodiment, the amplifier (AMP) 404 is unnecessary. An image processing unit 600 processes digital image data converted by the A/D conversion circuit 405. An interface controller (simply denoted as "interface" in FIG. 3) 406 reads image data from the image processing unit 600, exchanges control data with an external device 412, and outputs image data to it. Image data from the image processing unit 600 can also be output to an image-printing unit 700. The external device 412 is, for example, a personal computer (not shown). For example, the image processing unit 600 and a timing signal generation circuit 408 are formed as a 1-chip integrated circuit (ASIC).

The image-printing unit 700 converts image data from the interface controller 406 into binary data indicating "print" or "no-print" for each pixel, and prints an image on a printing medium using a printing material. The image-printing unit 700 can be, for example, an inkjet printer, a laser beam printer using an electrophotographic method, or a sublimation printer. These printers are well known, and a detailed description thereof will be omitted.

An output signal from the operation unit 4 is input to the input port of a CPU 409. The LCD 110 displays the contents of functions operable on the operation unit 4. When the user operates the operation unit 4 in accordance with the displayed function contents, the instructed contents are set in a RAM 411.

The CPU 409 in the form of a microcomputer controls an operation instruction from the operation unit 4. In this control, the CPU 409 reads out a processing program stored in a ROM 410, and executes it using the RAM 411 as a work area. In FIG. 3, a reference signal oscillator (OSC) 407 is, for example, a crystal oscillator. The timing signal generation circuit 408 divides an output from the reference signal oscillator 407 in accordance with the settings of the CPU 409, generating various timing signals serving as the base of the operation.

When the MFP apparatus operates based on an instruction from a personal computer (external device 412), the personal computer issues an instruction such as copying or image reading (scanning) to the CPU 409. A subsequent operation is the same as a copying or image reading (scanning) operation by a single MFP apparatus.

An LED 414 serves as the backlight source of the LCD 110, and its ON operation is controlled by an ON signal output from the timing signal generation circuit 408.

Figure 4:
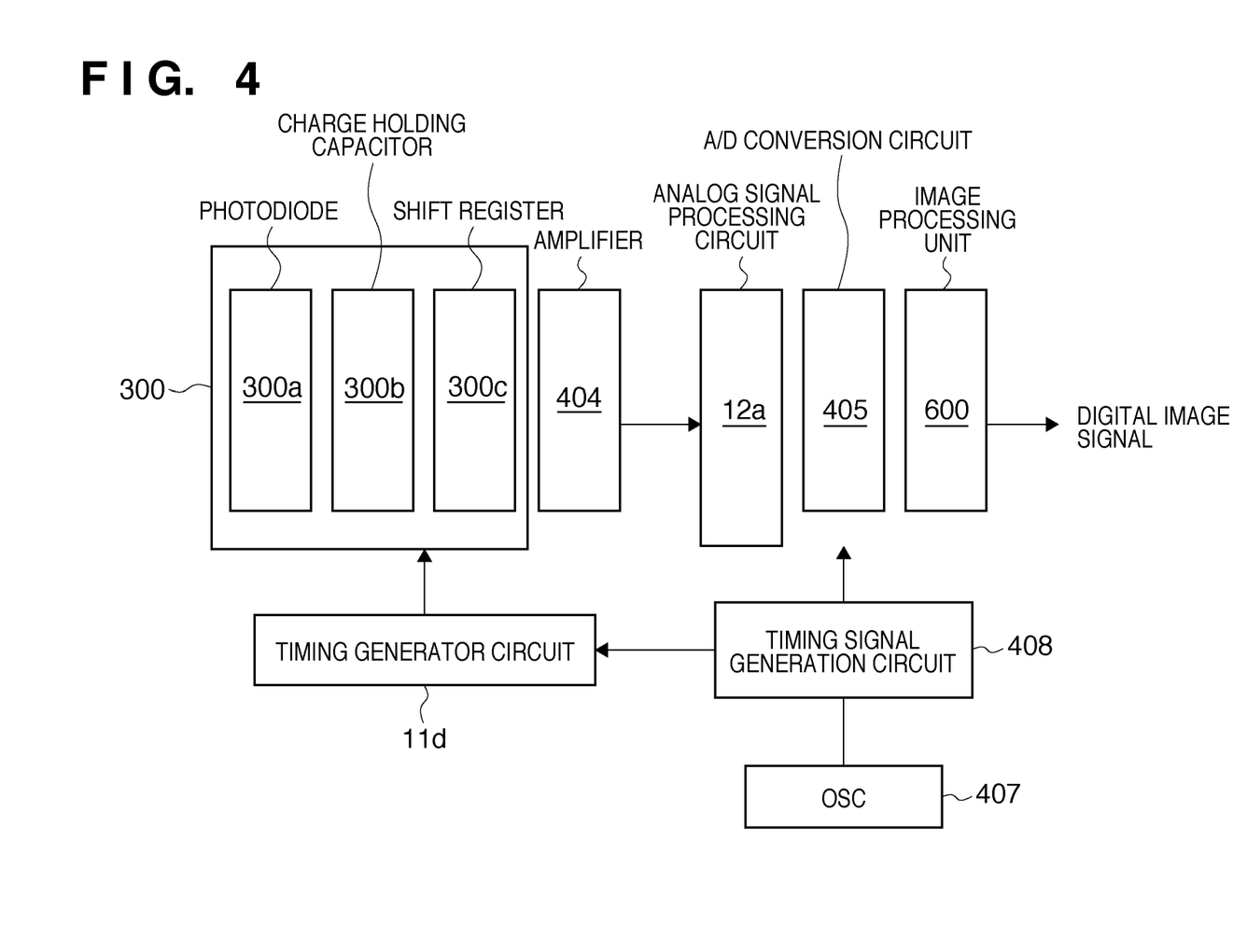
FIG. 4 is a block diagram showing details of a circuit arrangement up to generation of a digital image signal from an analog image signal generated by the CIS unit, out of the control circuit of the image reading apparatus shown in FIG. 3.
Figure 5:
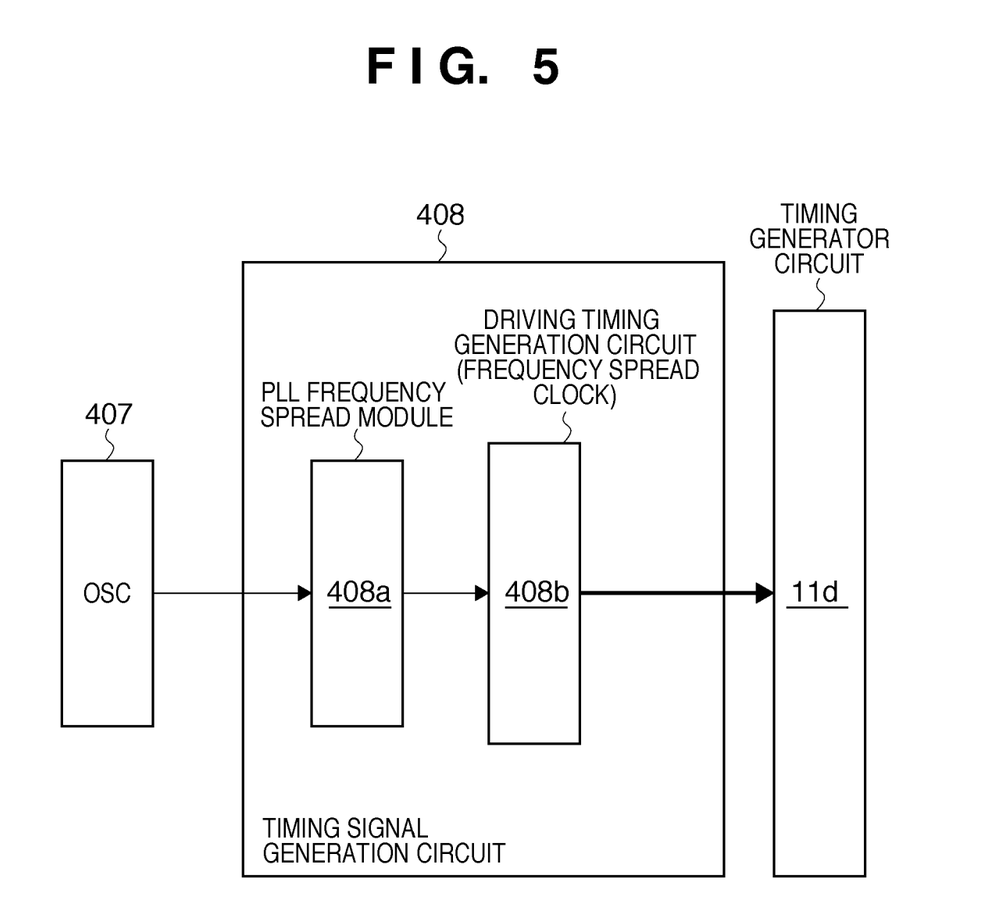
FIG. 5 is a block diagram showing the detailed arrangement of a timing signal generation circuit.

FIG. 4 is a block diagram showing details of a circuit arrangement up to generation of a digital image signal from an analog image signal generated by the CIS unit 300, out of the control circuit of the image reading apparatus shown in FIG. 3. Compared to FIG. 3, FIG. 4 illustrates an additional circuit regarding image reading. FIG. 5 is a block diagram showing the detailed arrangement of the timing signal generation circuit 408.

As shown in FIG. 4, a driving signal generated by the timing signal generation circuit 408 is transferred to a timing generator circuit 11d which generates a signal for the image reading timing of the CIS unit 300. As the driving signal, a driving timing generation circuit 408b generates a desired signal using a source signal from the reference signal oscillator (OSC) 407 after processing by a PLL circuit/SSCG spread circuit 408a, as shown in FIG. 5. The timing generator circuit 11d generates a timing signal having a driving waveform which matches the image reading specification or image reading sequence of the CIS unit 300. The timing generator circuit 11d sends the timing signal to a photodiode (photoelectric transducer) 300a, charge holding capacitor 300b, and shift register 300c of the CIS unit 300, which execute a series of image reading operations in synchronism with the timing signal. The series of image reading operations includes the following operations. More specifically, charges obtained by photoelectric conversion by the photodiode (photoelectric transducer) 300a are transferred to the charge holding capacitor 300b, thereby converting them into a voltage. The voltages are sequentially transferred via the shift register 300c and amplified by the amplifier 404. When the amplifier (AMP) 404 is built in a CMOS semiconductor substrate, like the embodiment, the amplifier (AMP) 404 is arranged in the CIS unit 300. Then, a subsequent analog signal processing circuit 12a performs analog processes such as waveform shaping and noise removal for the amplified analog image signal, and the A/D conversion circuit 405 converts the analog image signal into a digital image signal. The subsequent image processing unit 600 executes digital processing for the digital image signal, and generates digital read image data.

Several embodiments of image reading executed in the MFP apparatus having the above arrangement will be explained in detail.

First Embodiment

Figure 6:
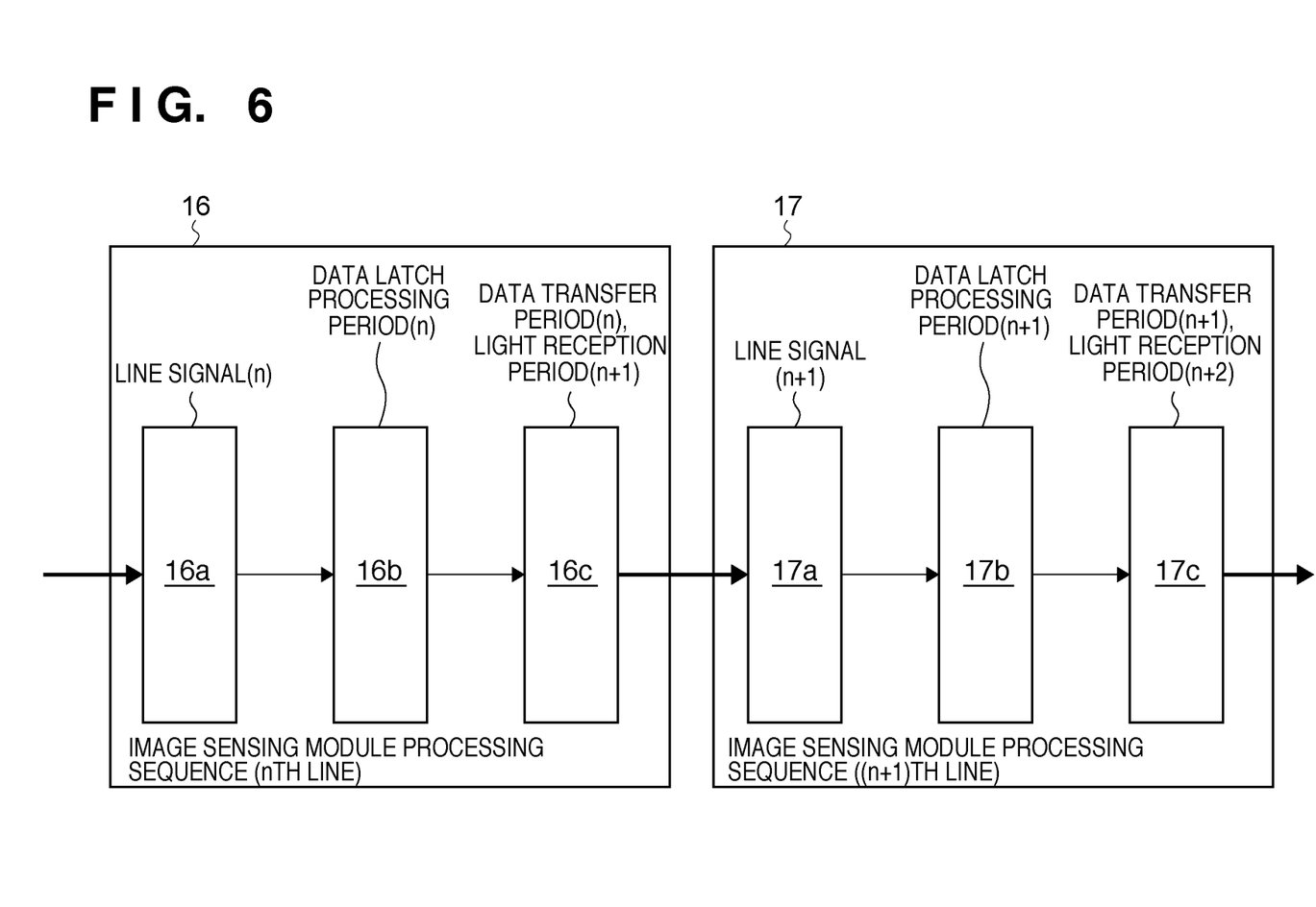
FIG. 6 is a block diagram showing the sequence of image reading processing executed in the CIS unit.

FIG. 6 is a block diagram showing the sequence of image reading processing executed in a CIS unit. FIG. 6 shows image reading processing 16 for the nth line, and image reading processing 17 for the (n+1)th line. In a CIS unit 300, after the nth line signal is supplied (16a), a data signal received on a previously read line ((n−1)th line) is latched (16b). Simultaneously when the latched data signal is transferred, a photodiode (photoelectric transducer) 300a receives an image data signal to be processed on the next line ((n+1)th line) (16c). The same processes are performed even for the next line ((n+1)th line) (17a, 17b, and 17c).

Figure 7:
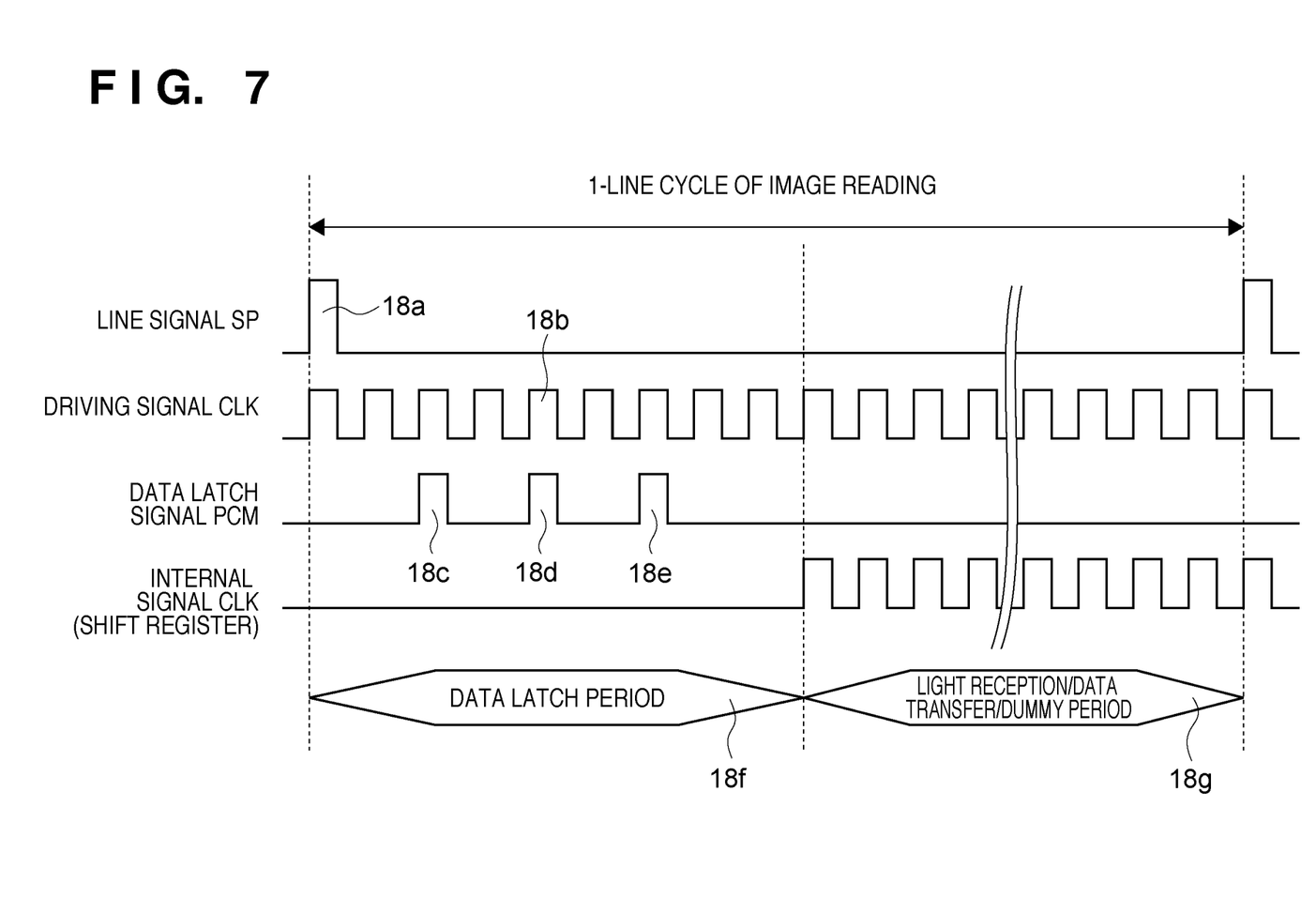
FIG. 7 is a timing chart of the image reading processing shown in FIG. 6.

FIG. 7 is a timing chart of the image reading processing shown in FIG. 6. After a line signal (SP) 18a is supplied, a timing generator circuit 11d supplies a data latch signal (PCM) 18c in synchronism with a driving signal (CLK) 18b after a specific period of time (upon the lapse of a specific number of clocks). After the line signal is latched, the timing generator circuit 11d supplies a reset signal 18d to reset the photodiode (photoelectric transducer) 300a.

To subtract a photodiode-specific offset component from a data signal obtained by photoelectric conversion, the timing generator circuit 11d supplies an offset component latch signal 18e after resetting the photodiode, thereby determining the offset component. After a data latch period 18f, image data signals each obtained by subtracting an offset component from a data signal obtained by photoelectric conversion are sequentially transferred via a shift register 300c. In a transfer period 18g, the discharged photodiode receives an image data signal of the next line.

Figure 8A:
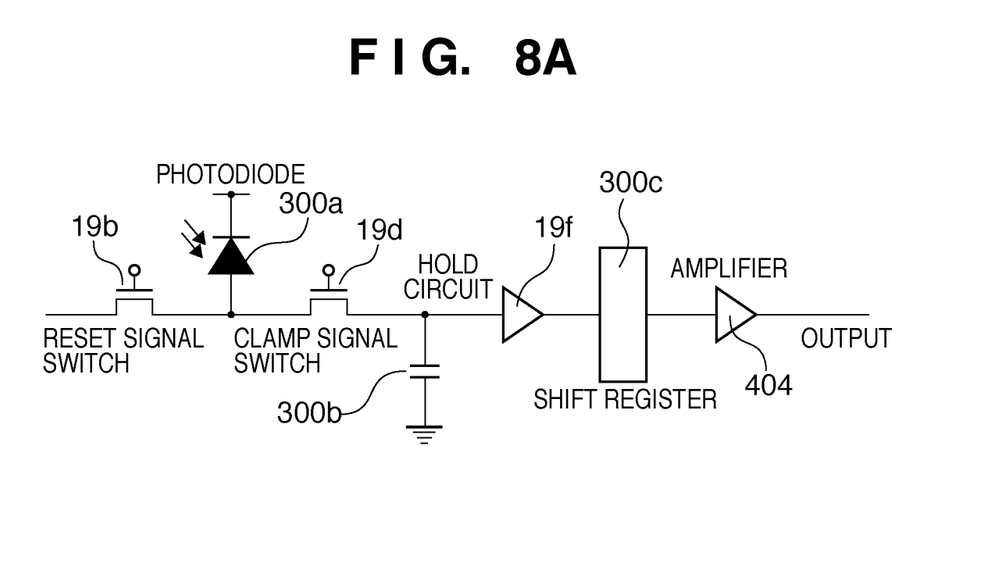
FIGS. 8A and 8B are circuit diagrams schematically showing the arrangement of a CMOS sensor (solid-state image sensing element).
Figure 8B:
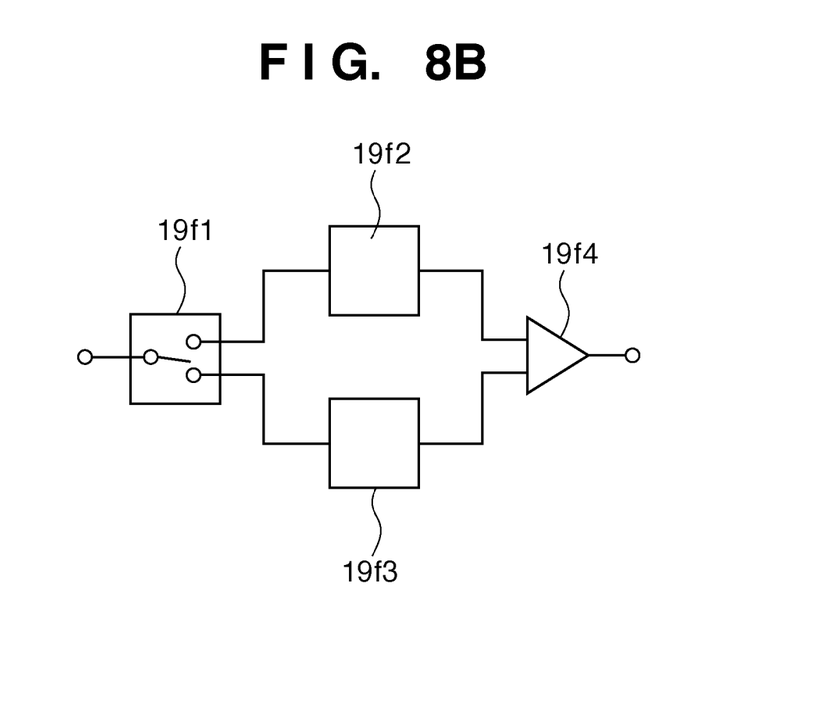

FIGS. 8A and 8B are circuit diagrams schematically showing the arrangement of a CMOS sensor (solid-state image sensing element). The operation of this circuit will be explained with reference to the timing chart shown in FIG. 7. In the arrangement shown in FIG. 8A, the CMOS sensor (solid-state image sensing element) is built in a CMOS semiconductor substrate. FIG. 8A shows this arrangement, while FIG. 8B shows an internal configuration of a holding circuit (to be described later). The CMOS sensor has a plurality of photodiodes. Two capacitors, that is, a data signal capacitor for holding stored charges and an offset capacitor are arranged for one photodiode. FIG. 8A does not illustrate the offset capacitor for descriptive convenience. Note that the timing generator circuit 11$d$ in FIG. 4 is also built in the CMOS semiconductor substrate.

When the data latch signal (PCM) 18$c$ is supplied to a clamp signal switch 19$d$, the clamp signal switch 19$d$ is temporarily turned on, and stored charges in the photodiode 300$a$ are transferred to a charge holding capacitor 300$b$, and a hold circuit 19$f$ holds the potential of the data signal. The reset signal 18$d$ is then supplied to a reset signal switch 19$b$, the clamp signal switch 19$d$ is temporarily turned on, and the charges in the photodiode 300$a$ flows out to a ground. As a result, the photodiode 300$a$ can be reset. After this, when the offset component latch signal 18$e$ is supplied to the clamp signal switch 19$d$, the clamp signal switch 19$d$ is temporarily turned on, and the stored charges corresponding to the offset component of the photodiode 300$a$ are transferred to the charge holding capacitor 300$b$. Thus, the potential voltage of the offset component is maintained in the hold circuit 19$f$. As shown in FIG. 8$b$, the holding circuit 19$f$ contains: a first holding circuit 19$f$2 for holding a data signal obtained by photoelectric conversion; a second holding circuit 19$f$3 for holding an offset component data signal; a selection circuit 19$f$1 for selecting either the first or second holding circuit; and a difference circuit 19$f$4. By switching the selection circuit 19$f$1, charges stored in the charge holding capacitor 300$b$ are selectively transferred to either the first holding circuit 19$f$2 or the second holding circuit 19$f$3. The selection circuit 19$f$1 selects the first holding circuit 19$f$2 according to the data latch signal (PCM) 18$c$, while it selects the second holding circuit 19$f$3 according to the offset component latch signal 18$e$. The holding circuit 19$f$ transfers an analog signal, from which an offset component is removed, obtained by photoelectric conversion, to the shift register. To do this, the difference circuit 19$f$4 generates an image signal by calculating the difference between a data signal, held in the first holding circuit 19$f$2, obtained by photoelectric conversion and the offset component held in the second holding circuit 19$f$3. The generated image data are sequentially transferred from the shift register 300$c$ within the transfer period 18$g$. After an amplifier 404 amplifies the data signal, a digital image signal is generated via an analog signal processing circuit 12$a$, A/D conversion circuit 405, and image processing unit 600.

Figure 9A:
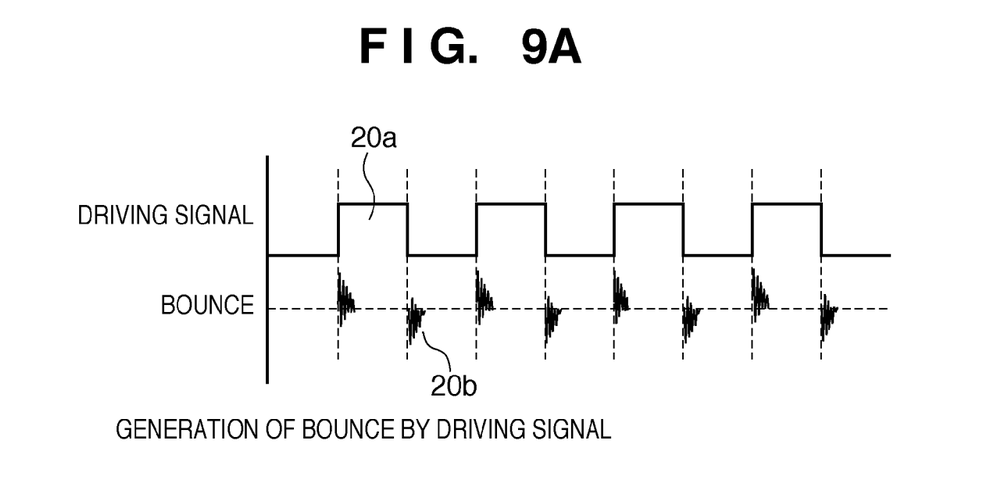
FIG. 9A is a time chart showing the relationship between a driving signal and bounce noise.
Figure 9B:
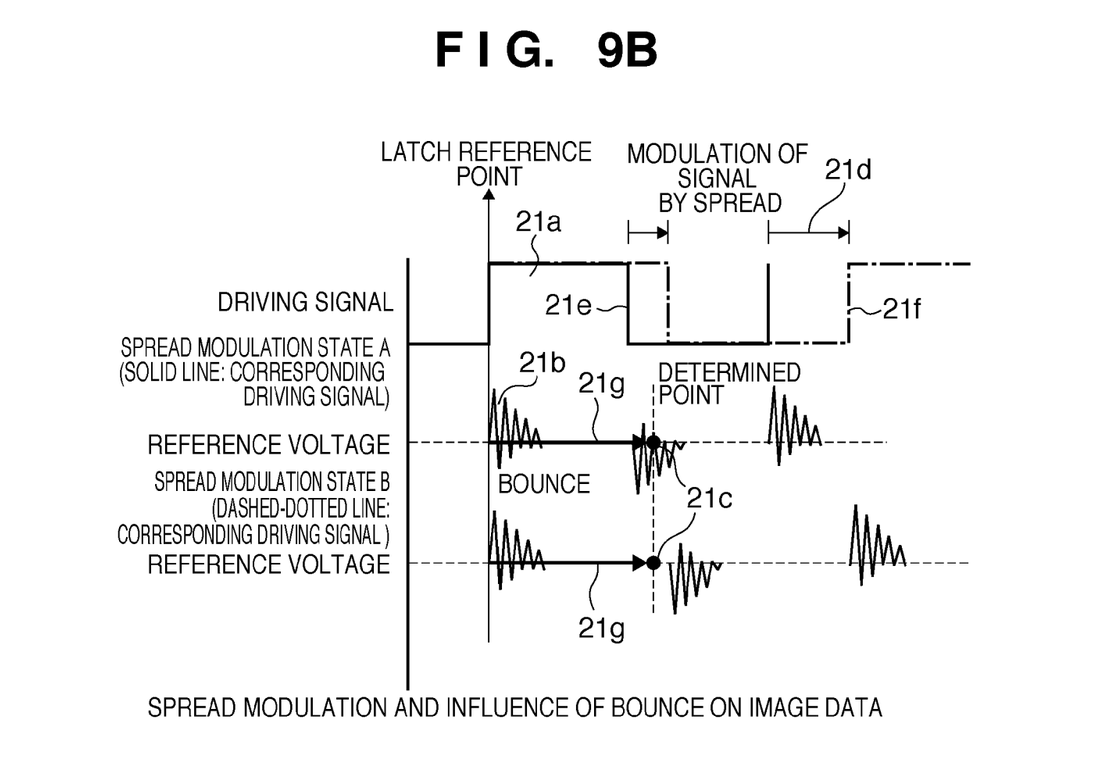
FIG. 9B is a time chart showing SSCG spread modulation and the influence of a bounce on image data.

FIG. 9A is a time chart showing the relationship between a driving signal and bounce noise. FIG. 9B is a time chart showing SSCG spread modulation and the influence of a bounce on image data. Bounce noise is fluctuations of the ground return voltage with respect to the reference voltage of the system.

FIG. 9A shows a state in which the reference voltage fluctuates in synchronism with switching on/off (rise/fall) of the driving signal. Recently, a bounce more readily occurs due to switching of a driving signal, external disturbance, or the like as downsizing of semiconductor elements and large-scale integration of circuits are promoted. The bounce influences other signal lines, and negative effects such as a malfunction of a logic circuit and a decrease in S/N ratio often appear.

FIG. 9B shows SSCG spread modulation and the influence of a bounce on image data in a CMOS solid-state image sensing element. FIG. 9B depicts two states for the spread modulation degree of the driving signal. More specifically, spread modulation occurs in the down-spread direction (rightward in FIG. 9B) in spread modulation state B, compared to spread modulation state A. In general, data latch starts in synchronism with a leading edge 21$f$ or trailing edge 21$e$ of a driving signal 21$a$ serving as a reference, and it usually takes a predetermined period of time to complete the latch. FIG. 9B schematically shows this state as a determined point 21$c$.

In FIG. 9B, the bounce state of the determined point 21$c$ at which data latch is completed differs between the two, spread modulation states A and B. More specifically, the two states are the same in a bounce generation timing 21$b$ and the degree of influence of the bounce, but are different in the bounce state at the data latch determined point 21$c$, and thus are greatly different in the influence on image data. In other words, the amount of mixed noise varies. In a black image, the amount of charges (potential obtained by photoelectric conversion) obtained by photoelectric conversion is small, so the influence of bounce noise is large. It will be intuitively understood from FIG. 9B that the contribution of the noise component to image data varies depending on a spread modulation degree 21$d$. In an image reading apparatus according to the embodiment, modulation processing by an SSCG module in a predetermined cycle is converted into image noise, and the noise sometimes appears as an unwanted line, stripe, or density unevenness in the main scanning direction of image reading.

As a simple method for solving the degradation of image reading, SSCG spread modulation of a supplied driving signal may be halted without exception. However, this method increases EMI unwanted radiation. In recent image reading apparatuses, the speed (frequency) of a driving signal such as a clock is increased to implement high-speed driving. It is often very difficult to suppress unwanted radiation without using the SSCG technique, in terms of cost, the number of design steps, design time constraint, and other technical aspect.

It is desirable to cancel or suppress bounce noise itself. However, a bounce readily occurs in the first place in a situation in which the image reading apparatus is requested of downsizing of modules, downsizing of elements for compact modules, large-scale integration of internal circuits, and high-speed driving. For this reason, an anti-bounce measure further raises the apparatus cost.

To solve or improve this problem by devising the apparatus driving timing, the line time (time taken to read one line) may be adapted to the spread modulation cycle of the SSCG module. Generally, after supplying a line signal and a specific number of reference clocks, acquisition of a data signal obtained by photoelectric conversion, resetting, and acquisition of offset data are performed. As described above with reference to FIG. 9B, the spread modulation degree of the driving signal and the amount of noise mixed with data are closely related to each other. By taking account of both the line time and the spread modulation cycle, the spread modulation degree can be set to be almost equal between lines in the sub-scanning direction, and the amount of mixed noise can be kept constant. However, mass-produced, marketed apparatuses always have the use environment difference for each user, the individual difference of each SSCG module, and the like. Considering this, the adaptation of the timing by firmware or software processing can expect a certain effect, but is still doubtful about a perfect or satisfactory effect.

From this, it is apparent that halting SSCG spread modulation without exception is a fundamental solution or remedy. However, the halt of spread modulation and the suppression of EMI unwanted radiation have a trade-off relationship. Considering the balance between them, it is the most desirable to halt spread modulation only at important timings in image reading.

These timings are the supply timings of the data latch signal 18$c$ and offset component latch signal 18$e$ shown in FIG. 7. The data latch signal 18$c$ and offset component latch signal 18e are supplied when transferring, to the charge holding capacitor 300b, a data signal obtained by photoelectric conversion by the photodiode (photoelectric transducer) 300a, and when latching an offset component after resetting the photodiode 300a. By halting spread modulation during the period of time until data is determined from the starting points of the latch signals 18c and 18e, an unwanted line, stripe, and density unevenness in the main scanning direction of image reading can be suppressed. In most cases, the elapse time till the completion of latching from the starting point of an image signal latch signal is several ten nano-sec to several μsec at most. This time is considerably shorter than the reading time of one line, and an increase in unwanted radiation can be satisfactorily suppressed. That is, high image quality and suppression of unwanted radiation can be achieved by halting spread modulation only in this period.

Figure 10A:
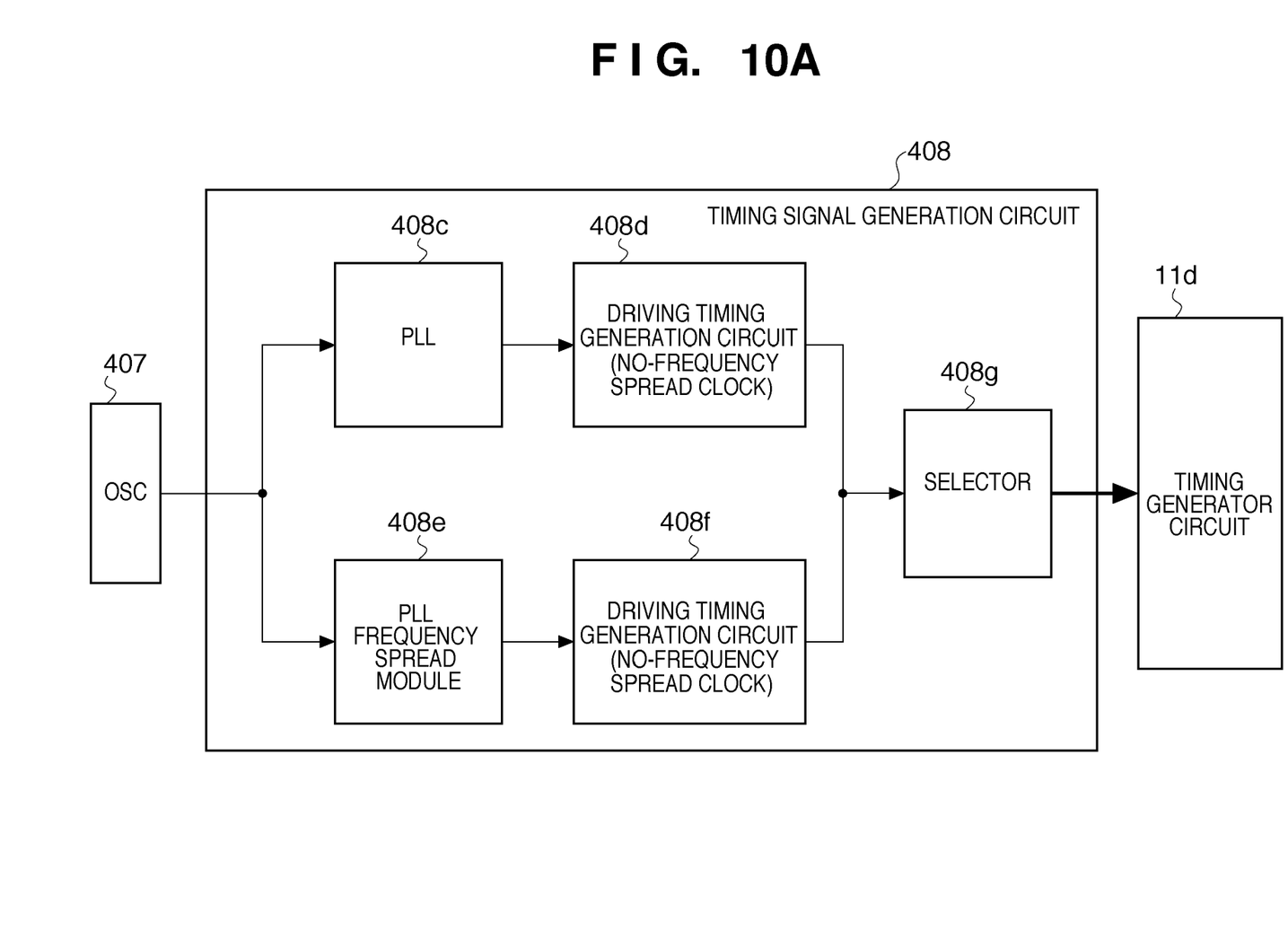
FIGS. 10A and 10B are block diagrams each showing the arrangement of a circuit which switches on/off SSCG spread modulation processing.
Figure 10B:
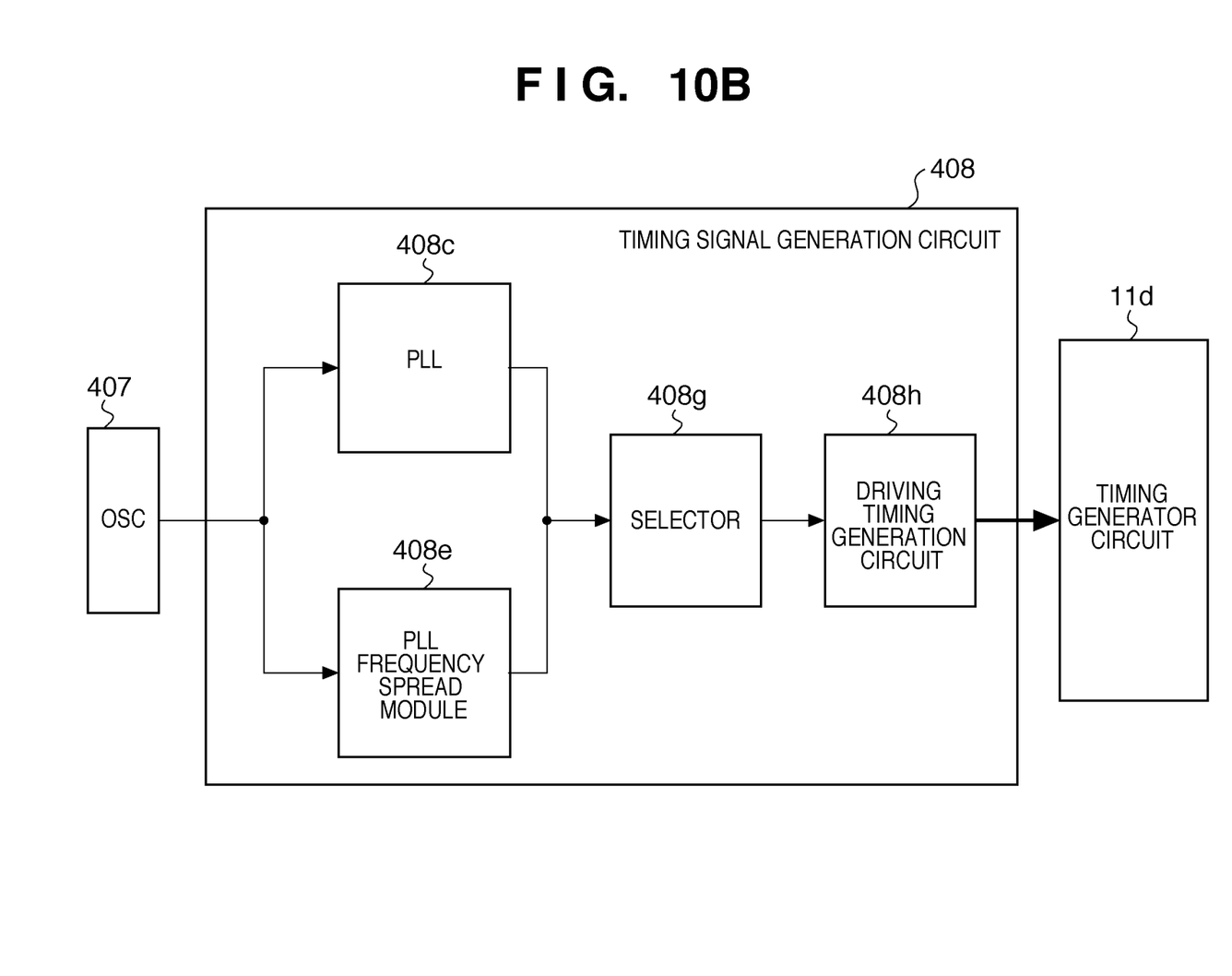

FIGS. 10A and 10B are block diagrams each showing the arrangement of a circuit which switches on/off SSCG spread modulation processing.

In the arrangement shown in FIG. 10A, a reference signal oscillator (OSC) 407 supplies a reference signal to a PLL block 408c including no SSCG spread modulation module, and a PLL block 408e including an SSCG spread modulation module. Multiplication driving signals output from the respective blocks are transferred to driving timing generation circuits 408d and 408f, respectively. A selector 408g selects either a driving signal having undergone spread processing or a driving signal having undergone no spread processing, which are respectively generated by the driving timing generation circuits 408d and 408f. The selector 408g transfers the selected driving signal to the timing generator circuit 11d, implementing switching of SSCG spread modulation processing. In this arrangement, the PLL block 408c and driving timing generation circuit 408d form the first generation unit, which generates the first driving signal to which no SSCG spread modulation is applied. The PLL block 408e and driving timing generation circuit 408f form the second generation unit, which generates the second driving signal to which SSCG spread modulation is applied.

In the arrangement shown in FIG. 10B, the reference signal oscillator (OSC) 407 supplies a reference signal to the PLL block 408c including no SSCG spread modulation module, and the PLL block 408e including the SSCG spread modulation module. The selector 408g selects either a driving signal having undergone spread modulation processing or a driving signal having undergone no spread modulation processing. The selector 408g supplies the selected driving signal to a driving timing generation circuit 408h, which generates a desired timing signal. The driving timing generation circuit 408h transfers the generated driving signal to the timing generator circuit 11d, implementing switching of SSCG spread modulation processing. In this arrangement, the PLL block 408c forms the first generation unit, which generates the first driving signal to which no SSCG spread modulation is applied. The PLL block 408e forms the second generation unit, which generates the second driving signal to which SSCG spread modulation is applied. The driving timing generation circuit 408h is a unit common to the first and second generation units.

According to the above-described first embodiment, high image quality and suppression of unwanted radiation can be achieved by implementing switching of SSCG spread modulation and halting spread modulation processing for only specific pixels in the above-mentioned latch period using the circuit arrangements of the two examples shown in FIGS. 10A and 10B. Image degradation can therefore be suppressed while suppressing EMI unwanted radiation.

Note that the above-described embodiment uses a CMOS sensor (solid-state image sensing element). This example adopts a structure for transferring, at once to a capacitor, a data signal obtained by photoelectrically converting charges in all pixels or a certain number of pixels in the main scanning direction after the CMOS sensor receives light for reading one line, and then converting the data signal into a voltage value, and a circuit which applies SSCG spread modulation to a driving signal. For a circuit having this arrangement, the present invention is effective as a method of suppressing noise in an image data signal. That is, the present invention is effective for obtaining a stable signal level in an arrangement in which the signal level is detected a specific time after the leading/trailing edge of the driving signal regardless of whether the signal is analog or digital in a circuit which uses various kinds of semiconductor elements and employs SSCG spread modulation.

Note that Japanese Patent Laid-Open No. 2007-081540 proposes a method of halting spread modulation in various image reading periods when a CCD sensor is used as a solid-state image sensing element. The use of the CCD sensor in Japanese Patent Laid-Open No. 2007-081540 has a feature in that the ON/OFF state of spread modulation processing is selected in a specific time in a period during which a shift register operates. To the contrary, the present invention has a feature in that the ON/OFF state of spread modulation is switched in a period during which a data signal obtained by photoelectric conversion is transferred at once to a capacitor while an operation of a shift register halts. In this manner, image reading using a CCD sensor as a solid-state image-sensing element and image reading using a CMOS sensor as a solid-state image-sensing element are greatly different in feature and arrangement.

Second Embodiment

Figure 11:
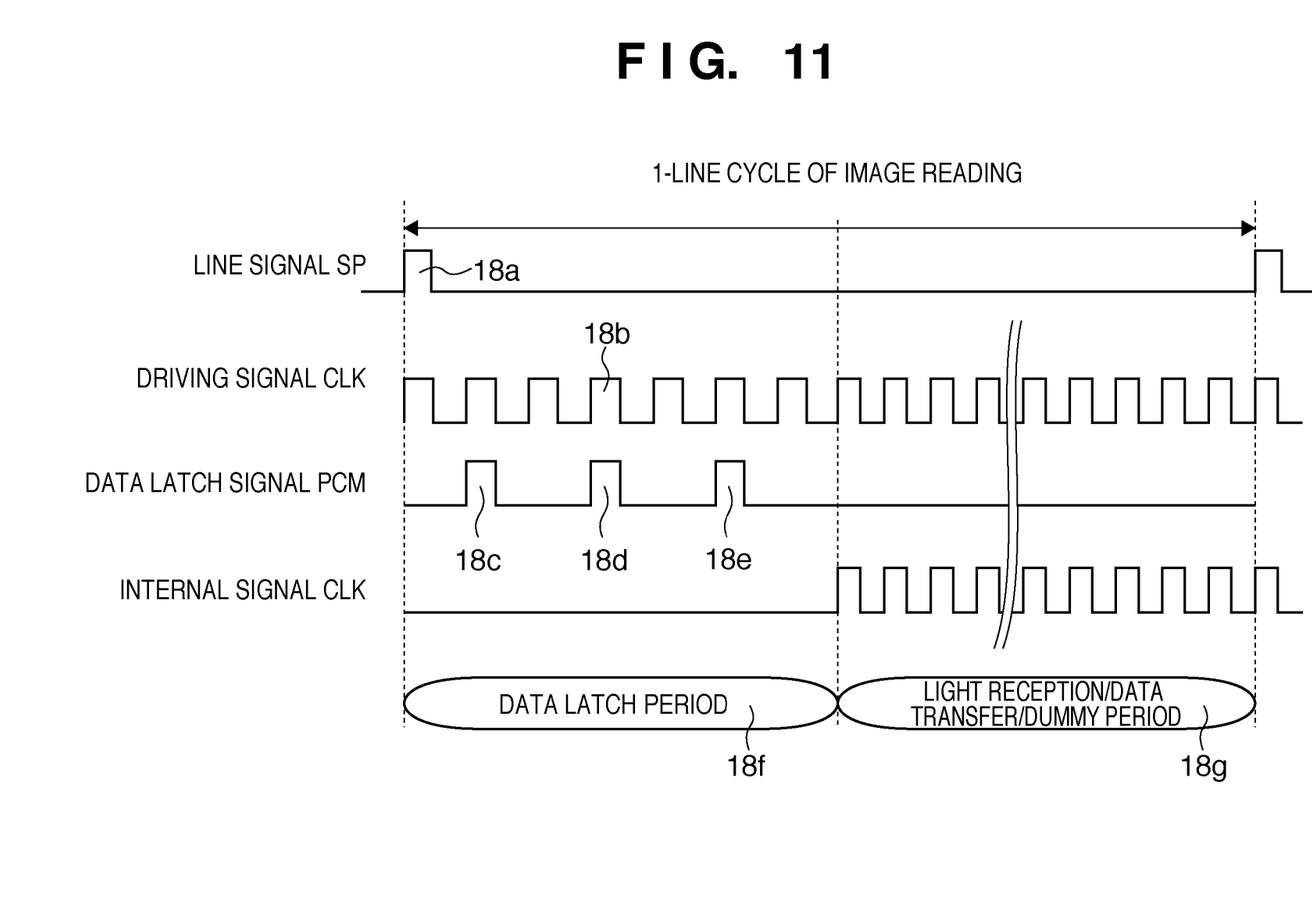
FIG. 11 is a timing chart of image reading processing according to a second embodiment.

FIG. 11 is a timing chart of image reading processing according to the second embodiment. In FIG. 11, the same reference numerals and symbols as those in the timing chart of image reading processing shown in FIG. 7 according to the first embodiment denote the same signals and periods, and a description thereof will not be repeated.

In the second embodiment, the frequency of the driving signal is set to be different between the data latch period and the light reception/data transfer/dummy period in the one-line cycle of image reading.

As is apparent from a comparison between FIGS. 11 and 7, in the second embodiment, the frequency of the driving signal is set to different values between a data latch period 18f and a light reception/data transfer/dummy period 18g. In the second embodiment, no SSCG spread modulation is performed in the data latch period 18f. Thus, since no high-frequency driving signal is spread, the EMI radiation level rises, compared to the light reception/data transfer/dummy period 18g, and may exceed the regulated value. To prevent this, the frequency of the driving signal (CLK) is decreased to a predetermined one in the data latch period 18f, as shown in FIG. 11. This can suppress the EMI radiation level not to exceed the regulated value. The data latch period 18f is merely a time of several ten pulses of the driving signal (CLK), occupies only a small portion of the 1-line cycle of image reading, and hardly affects the total image reading time.

In the light reception/data transfer/dummy period 18g, SSCG spread modulation is executed to spread the frequency of the driving signal, so the EMI radiation level is considered not to exceed the regulated value.

As described above, even in the second embodiment, a period during which SSCG spread modulation is performed and one during which no SSCG spread modulation is performed exist within the one-line cycle of image reading. Thus, a timing signal generation circuit 408 switches SSCG spread modulation. This arrangement is the same as that described in the first embodiment with reference to FIG. 10, and a description thereof will not be repeated. According to the second embodiment, in the arrangements shown in FIGS. 10A and 10B, a PLL block 408c including no SSCG spread modulation module, and a PLL block 408e including an SSCG spread modulation module generate clock signals having different frequencies. More specifically, the frequency of a clock signal generated by the PLL block 408c is lower than that of a clock signal generated by the PLL block 408e.

According to the above-described second embodiment, switching of SSCG spread modulation is implemented, spread modulation processing is halted during the latch period in the one-line cycle of image reading, and a driving signal whose frequency differs between the data latch period and the light reception/data transfer/dummy period is set. As a result, quality degradation of a read image and unwanted radiation can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-293200, filed Dec. 24, 2009, which is hereby incorporated by reference herein in its entirety.

What is claimed is:

1. An image reading apparatus which reads an original image by using a photoelectric transducer, comprising:
   a first generation unit configured to generate, from a reference signal, a first driving signal to which SSCG spread modulation is applied;
   a second generation unit configured to generate, from the reference signal, a second driving signal to which no SSCG spread modulation is applied;
   a selection unit configured to select one of the first driving signal and the second driving signal;
   a timing signal generation unit configured to generate a timing signal for reading the original image, based on the driving signal selected by said selection unit;
   a latch unit configured to latch an image signal obtained by the photoelectric transducer, using the timing signal generated by said timing signal generation unit; and
   a transfer unit configured to transfer the image signal latched by said latch unit for subsequent image processing,
   wherein in a one-line original image reading operation, said selection unit selects the second driving signal till completion of a latch operation by said latch unit, and after the latch operation, selects the first driving signal for an image signal transfer operation by said transfer unit.

2. The apparatus according to claim 1, wherein said second generation unit generates the second driving signal which is lower in frequency than the first driving signal generated by said first generation unit.

3. The apparatus according to claim 1, wherein
   the photoelectric transducer comprises a CMOS sensor, and
   the completion of the latch operation includes latching an image signal received by the CMOS sensor, and latching an offset component specific to the CMOS sensor.

4. An image reading method in an image reading apparatus which reads an original image by using a photoelectric transducer, comprising:
   a first generation step of generating, from a reference signal, a first driving signal to which SSCG spread modulation is applied;
   a second generation step of generating, from the reference signal, a second driving signal to which no SSCG spread modulation is applied;
   a selection step of selecting one of the first driving signal and the second driving signal;
   a timing signal generation step of generating a timing signal for reading the original image, based on the driving signal selected in the selection step;
   a latch step of latching an image signal obtained by the photoelectric transducer, using the timing signal generated in the generation step; and
   a transfer step of transferring the image signal latched in the latch step for subsequent image processing,
   wherein in the selection step, in reading of a one-line original image, the second driving signal is selected till completion of a latch operation in the latch step, and after the latch operation, the first driving signal is selected for an image signal transfer operation in the transfer step.

5. A multifunction printer comprising:
   an image reading apparatus according to claim 1; and
   a printing unit configured to print an image on a printing medium based on one of image data indicating an image read by said image reading apparatus, or externally input image data.

6. The apparatus according to claim 1, further comprising an oscillator configured to generate the reference signal.

7. An image reading apparatus which reads an original image by using a photoelectric transducer, comprising:
   a driving signal generation unit configured to generate, from a reference signal, a first driving signal whose frequency is spread-modulated and a second driving signal whose frequency is not spread-modulated;
   a latch unit configured to latch an image signal obtained by the photoelectric transducer, using the second driving signal; and
   a transfer unit configured to transfer the image signal latched by said latch unit, using the first driving signal, for subsequent image processing.

8. The apparatus according to claim 7, further comprising a timing signal generation unit configured to generate an image latch signal so as to latch the image signal obtained by the photoelectric transducer.

9. The apparatus according to claim 7, wherein a period for a one-line original image reading operation includes a first period and second period,
   said latch unit latches the image signal obtained by the photoelectric transducer during the first period, and
   said transfer unit transfers the image signal latched by said latch unit during the second period.

10. The apparatus according to claim 7, wherein said driving signal generation unit generates the second driving signal which is lower in frequency than the first driving signal.

11. The apparatus according to claim 7, wherein
    the photoelectric transducer comprises a CMOS sensor, and the completion of the latch operation includes latching an image signal received by the CMOS sensor, and latching an offset component specific to the CMOS sensor.

12. The apparatus according to claim 7, further comprising an oscillator configured to generate the reference signal.

13. An image reading method in an image reading apparatus which reads an original image by using a photoelectric transducer, comprising:
- a first generation step of generating, from a reference signal, a first driving signal whose frequency is spread-modulated;
- a second generation step of generating, from the reference signal, a second driving signal whose frequency is not spread-modulated;
- a latch step of latching an image signal obtained by the photoelectric transducer, using the second driving signal generated in the second generation step; and
- a transfer step of transferring the image signal latched in the latch step, using the first driving signal generated in the first generation step, for subsequent image processing.

14. A multifunction printer comprising:
an image reading apparatus according to claim 7; and
a printing unit configured to print an image on a printing medium based on one of image data indicating an image read by said image reading apparatus, or externally input image data.

\* \* \* \* \*